United States Patent
Tamamoto et al.

(10) Patent No.: US 7,395,794 B2
(45) Date of Patent: Jul. 8, 2008

(54) ENGINE STARTING APPARATUS (75) Inventors: Riyuuhei Tamamoto, Wako (JP); Makoto Yamamura, Wako (JP); Mitsuyoshi Kanai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/578,750

(22) PCT Filed: Nov. 12, 2004

(86) PCT No.: PCT/JP2004/016831

§ 371 (c)(1), (2), (4) Date: May 10, 2006

(87) PCT Pub. No.: WO2005/050006

PCT Pub. Date: Jun. 2, 2005

(65) Prior Publication Data

US 2007/0079783 A1   Apr. 12, 2007

(30) Foreign Application Priority Data

Nov. 21, 2003  (JP) .......................... P2003-392533

(51) Int. Cl.
*F02N 3/00* (2006.01)
*F02N 17/00* (2006.01)

(52) U.S. Cl. .................. 123/179.28; 123/185.1

(58) Field of Classification Search ............ 123/179.28, 123/179.22, 185.2, 185.3, 185.1, 185.11, 123/185.12, 185.13
See application file for complete search history.

(56) References Cited

U.S. PATENT DOCUMENTS

| | | | | |
|---|---|---|---|---|
| 4,023,550 A | * | 5/1977 | Houston | 123/198 D |
| 4,727,851 A | * | 3/1988 | Orova | 123/406.56 |
| 5,383,433 A | * | 1/1995 | Fiorenza, II | 123/406.56 |
| 5,419,291 A | | 5/1995 | Kimata et al. | |
| 6,973,911 B2 | * | 12/2005 | Yamashita | 123/335 |
| 2004/0255901 A1 | * | 12/2004 | Yamashita | 123/335 |

FOREIGN PATENT DOCUMENTS

| | | |
|---|---|---|
| JP | 61-272472 | 12/1986 |
| JP | 2-145669 U | 2/1990 |
| JP | 6010724 | 1/1994 |
| JP | 7-317637 | 12/1995 |
| JP | 9-144636 | 6/1997 |
| JP | 9-236071 | 9/1997 |
| JP | 11-173248 A * | 6/1999 |

OTHER PUBLICATIONS

"How does a magneto work?" HowStuffWorks. Apr. 2, 2007. HowStuffWorks, Inc. Apr. 2, 2007. <http://science.howstuffworks.com/question375.htm/printable>.*

(Continued)

*Primary Examiner*—Stephen K. Cronin
*Assistant Examiner*—Ka Chun Leung
(74) *Attorney, Agent, or Firm*—Westerman, Hattori, Daniels & Adrian, LLP.

(57) ABSTRACT

In an engine which starts using a recoil starter, ignition chance during inertia rotation is not missed. If the engine 42 is rotated by the recoil starter 41, output of a power generator which is directly connected to the engine 42 is increased, and a CPU 27 is reset at timing t0. At timing t1, if pulse P1 is input from a revolution number sensor 29 to the CPU 27, the CPU 27 outputs first ignition instructions when predetermined time T1 is elapsed (t2). At timing t3, second pulse P2 is input. At that time point, since the CPU 27 is normally operated, ignition timing is obtained from an ignition timing map 30 in accordance with the revolution number calculated by a time interval between the pulses P1 and P2, and the ignition instructions are output at timing t4 in accordance with the ignition timing. Thereafter, the ignition timing is determined using the ignition timing map 30.

3 Claims, 5 Drawing Sheets

OTHER PUBLICATIONS

"Flywheel." Wikipedia, The Free Encyclopedia. Apr. 2, 2007, 07:29 UTC. Wikimedia Foundation, Inc. Apr. 2, 2007 <http://en.wikipedia.org/w/index.php?title=Flywheel&oldid=119670496>.*

International Search Report mailed Feb. 1, 2005 of International Application PCT/JP2004/016831.

Translation of the International Preliminary Report on Patentability of International Application No. PCT/JP2004/016831, with Form PCT/IB/373 and Form PCT/ISA/237.

* cited by examiner

ENGINE STARTING APPARATUS

TECHNICAL FIELD

The present invention relates to a starting apparatus for an internal combustion engine (simply referred to as "engine", hereinafter), and more particularly, to an engine starting apparatus capable of easily starting the engine by a manual starting operation device such as a recoil starter and make a microcomputer enable to operate without providing a battery.

BACKGROUND ART

In a small engine such as a general purpose engine and an agricultural purpose engine having a manual operation starting device such as a recoil starter, ignition timing of the engine is preset mechanically, and the ignition position (ignition timing) is typically changed by adjusting an electric circuit constant.

Furthermore, in recent years, it is proposed to provide the engine with an ignition device which digitally controls the ignition timing using a microcomputer (for example, Japanese Patent Application Laid-open No. 9-236071).

Patent Document 1: JP 09-236071 A

DISCLOSURE OF THE INVENTION

Problem to be Solved by The Invention

According to the ignition device described in the above patent document, when the engine is to be started, it is necessary to start up the microcomputer (CPU) using electricity from a battery. Thus, in the case of an engine driving utility machine such as a cultivator and a mowing machine which have no power source such as a battery, the engine is rotated manually to start. In this case, the ignition operation can not be carried out until sufficient mount of electric power is supplied to the CPU to start up the CPU from a power generator which is driven by the engine.

In order to start the ignition using electricity from the power generator, it is necessary to carry out a series of processing (reset of the CPU, start up the CPU, and software processing for determining the ignition timing) while an engine is inertially rotating after the engine starts rotating by means of a manual starting operation device, namely, while electricity is generated by such inertia rotation. Therefore, it is extremely difficult to employ a digital control type ignition device using a CPU in an engine having no battery.

It is possible to process a first ignition signal in hardware manner using an electrical circuit until the CPU starts up, however, since a special hardware configuration is required, the circuit becomes inevitably complicated.

It is an object of the present invention to solve the above problem, and to provide an engine starting apparatus capable of starting up a CPU during manual inertia rotation of an engine to start ignition operation.

Means for Solving Problem

According to a first feature of the present invention, in an engine starting apparatus including an ignition device which is controlled by a microcomputer using electricity output from the power generator, which is directly driven by the engine, as a power supply, the engine starting apparatus further includes a humanly operative device which rotates a flywheel connected to a crankshaft of the engine, an initial igniting function for generating ignition instructions when preset time is elapsed after a reference signal represents an engine rotation position is first input to the microcomputer after the microcomputer starts up by the electricity output from the power generator operated by the humanly operative starting device.

According to a second feature of the invention, the preset time is set such that the ignition instructions are generated with ignition angle which is lagged from ignition angle used at the time of rating operation when the engine revolution number by the operation of the humanly operative starting device is predetermined lowest starting revolution number.

According to a third feature of the invention, after the microcomputer generates the ignition instructions by the initial ignition function, the ignition instructions are generated at ignition angle corresponding to the engine revolution number.

According to a fourth feature, the ignition device ignites at ignition angle corresponding to the engine revolution number.

Effect of the Invention

In humanly, for example, manually operative starting of an engine using a recoil starter or the like, it is necessary to instruct the ignition without missing ignition chance within a short time during which a flywheel is inertially rotating after operation for starting. According to the present invention, as soon as a microcomputer starts up, ignition instructions can be generated at time point when a reference signal of an engine rotation position is input. Therefore, it is possible to ignite without missing many ignition chances during the inertia rotation. The ignition instructions do not require a special circuit configuration, and the instructions can be processed in the software manner by a microcomputer and can be generated.

According to the second feature, when the engine revolution number is equal to the intended lowest starting revolution number, the engine starting apparatus is set such that ignition instructions are generated with ignition angle which is lagged as compared with ignition angle used during rating operation. Therefore, even if the starting operation is unstabled, that is to say, even if the engine starting revolution number is varied, it is possible to issue the first ignition instructions in an appropriate ignition zone irrespective of the variation only if the starting revolution number reaches the lowest starting revolution number.

According to the third feature, it is possible to set the second and subsequent ignition instructions to optimal value corresponding to the revolution number.

According to the fourth feature, since the ignition angle can be determined quickly and easily in reply to the engine revolution number, it is possible to issue the ignition instructions quickly within a short time during the inertia rotation of the engine.

DESCRIPTION OF THE REFERENCE NUMERALS 1, 42 . . . engine, 27 . . . CPU (microcomputer), 29 . . . revolution number sensor, 30 . . . ignition timing map, 40 . . . tiller, 41 . . . recoil starter

BEST MODE FOR IMPLEMENTING THE INVENTION

Figure 2:
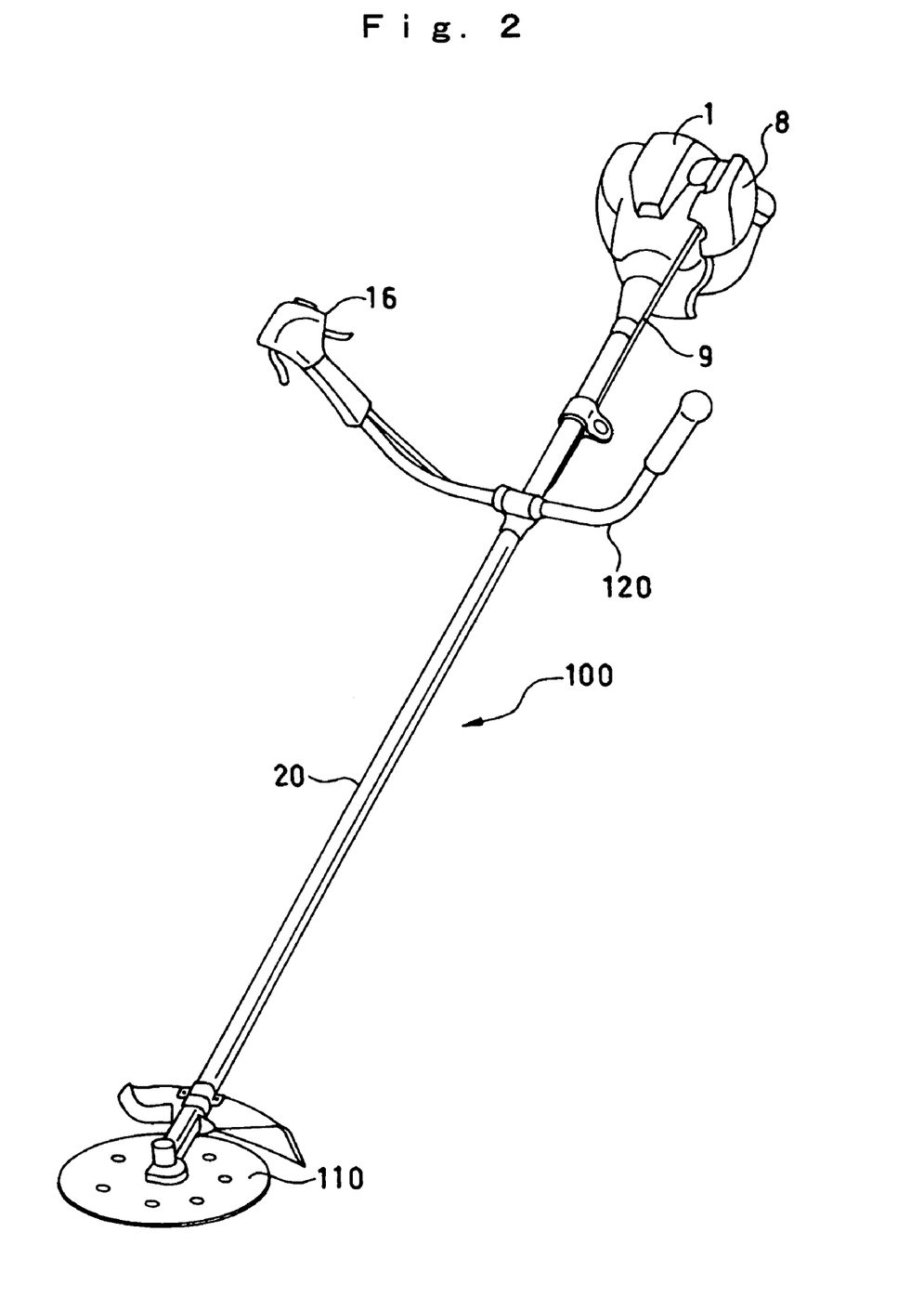
FIG. 2 is a perspective view of a suitable mowing machine to which the engine starting apparatus of the embodiment of the invention is applied.

An embodiment of the present invention will be explained in detail with reference to the drawings. FIG. 2 is a perspective view of a mowing machine which is a first example of a working machine having an engine to which an engine starting apparatus of the embodiment of the present invention can be applied. In FIG. 2, the mowing machine 100 includes an engine 1, an operating sleeve 20 which extends from the engine 1 and which is provided at its tip end with a cutting blade 110, a handle 120 provided at an intermediate portion of the operating sleeve 20, and an operating device 16 which is provided on a right side end of the handle 120 and which also functions as a grip. The mowing machine 100 further includes a throttle cable 9 extending from the operating device 16 to a carburetor 8 of the engine. The engine 1 is a small sized (for example, displacement of 25 cm$^3$) air-cooled four stroke single-cylinder engine which is suitable for the mowing machine 100. The engine 1 is manually started by a recoil starter (not shown).

Figure 3:
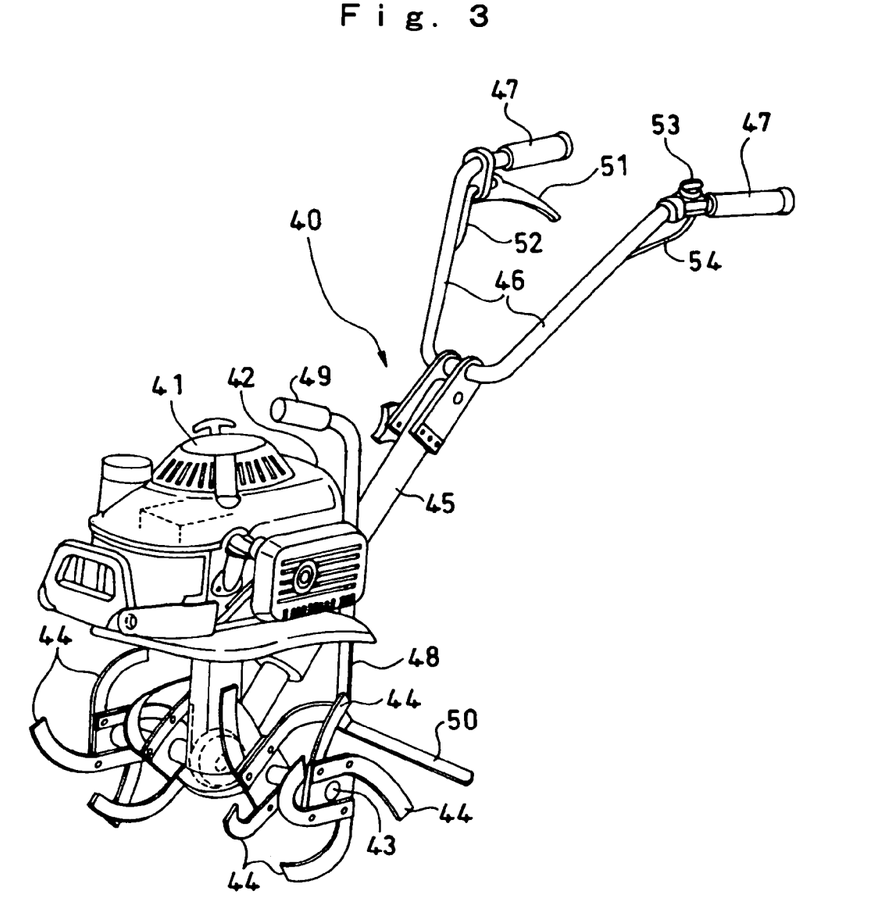
FIG. 3 is a perspective view of a suitable tiller to which the engine starting apparatus of the embodiment of the invention is applied.

FIG. 3 is a perspective view of a tiller which is a second example of the working machine having an engine to which the engine starting apparatus of the embodiment of the invention can be applied. The tiller 40 is provided with an engine 42 having a vertical shaft output. The engine 42 includes a recoil starter 41. Output of the engine 42 is transmitted to an operator shaft 43 located below the engine 42. A plurality of cultivating claws 44 are mounted on the operator shaft 43. A handle post 45 extends from a frame of the engine 42 rearward and upward. A tip end of the handle post 45 is bifurcated to form a handle 46. Tip ends of the handle 46 are provided with grips 47 and 47. The handle post 45 is provided with a vertically extending post 48. The post 48 is provided at its upper end with a grip 49 which is used for bringing the tiller 40 upward and carrying the same. A lower end 50 of the post is used as a resistant rod for adjusting the cultivating height.

The right handle is provided with a throttle lever 51. A throttle cable 52 is connected to the carburetor (not shown). The grip 47 of the left handle is provided with an engine stop switch 53. A switch cord 54 pulled out from the engine stop switch 53 is connected to a fuel cut device and an ignition stop device provided in the engine 42.

Figure 4:
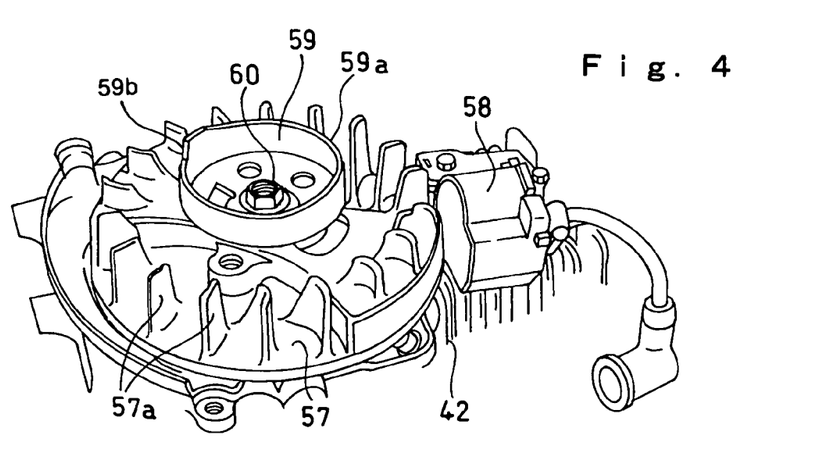
FIG. 4 is a perspective view of a main portion of the engine on which a recoil starter is mounted.

FIG. 4 is a perspective view of an upper portion of the engine from which the recoil starter 41 is removed. A flywheel 57 having a fan blade 57a is connected to a crankshaft (its tip end is shown with a reference numeral 60) of the engine 42. An ignition coil 58 is disposed adjacent to the flywheel 57. A starter pulley 59 is mounted on the crankshaft together with the flywheel 57. The starter pulley 59 is of a cup-like shape, and its end surface is a cam surface 59a which is engaged with the recoil starter 41.

Figure 5:
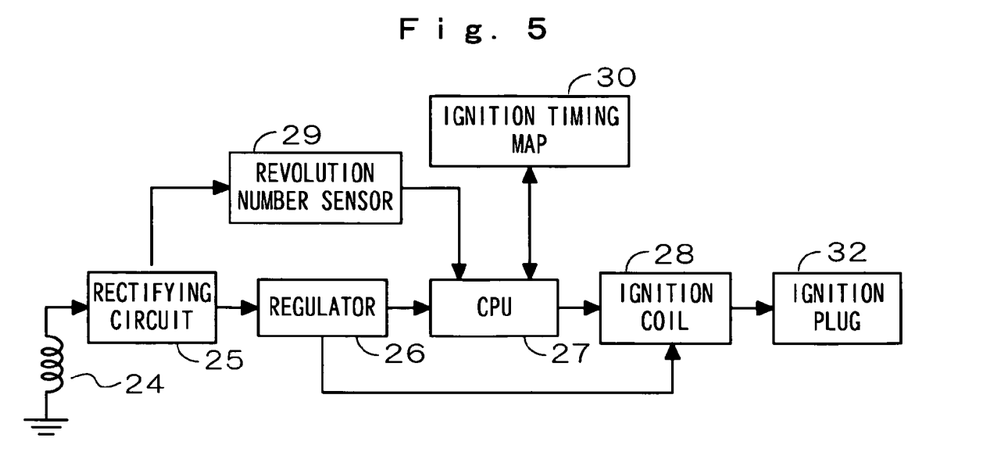
FIG. 5 is a block diagram showing a hardware configuration of the engine starting apparatus.

FIG. 5 is a block diagram showing a configuration of the engine starting apparatus applied to the engine shown in FIGS. 2 and 3. The engine 1 or 42 (engine 42 is represented of them, hereinafter) includes a flywheel power generator which is directly connected to the engine 42. A power generating coil 24 of the flywheel power generator outputs current, and the current is rectified by a rectifying circuit 25. The rectified current is inputted to a regulator 26 and is adjusted into predetermined voltage. That is, the regulator 26 adjusts output voltage of the coil 24 such that the voltage is suitable as operating voltage of a CPU 27 and as primary voltage of an ignition coil 28.

A revolution number sensor 29 outputs a pulse signal every time when the power generator rotates once based on waveform after rectified by the rectifying circuit 25. The CPU 27 calculates the frequency of the power generator, namely, a value representing the revolution number of the engine 42 based on the period of the pulse signal. The engine starting apparatus is provided with an ignition timing map 30. In the ignition timing map 30, the ignition timing (shown with crank angle) is set related to the engine revolution number calculated by the CPU 27 based on the output pulse of the revolution number sensor 29. The CPU 27 retrieves the ignition timing map 30 and reads the ignition timing corresponding to the input engine revolution number. The CPU 27 may be structured to calculate the ignition timing using functions of preset engine revolution number instead of retrieving the map. In any cases, the relation between the engine revolution number and the ignition timing is calculated digitally using digital data.

The crank angle of the engine 42 can be detected by adding a constant determined in correspondence with the disposition position of the revolution number sensor 29 to output pulse timing of the revolution number sensor 29. The CPU 27 outputs the ignition instructions to the ignition coil 28 when the crank angle which is read from the ignition timing map 30 and the current crank angle which is detected with output pulse timing of the revolution number sensor 29 coincide with each other. Corresponding to the ignition instructions, the ignition coil 28 generates high voltage in a secondary coil connected to an ignition plug 32 and ignites the ignition plug 32.

In order to determine the ignition timing using the ignition timing map 30 and to ignite the ignition plug 32, it is necessary that the CPU 27 starts up and a program normally starts operating. In the control device of this embodiment, ignition instructions can be generated until the program normally operates.

Figure 1:
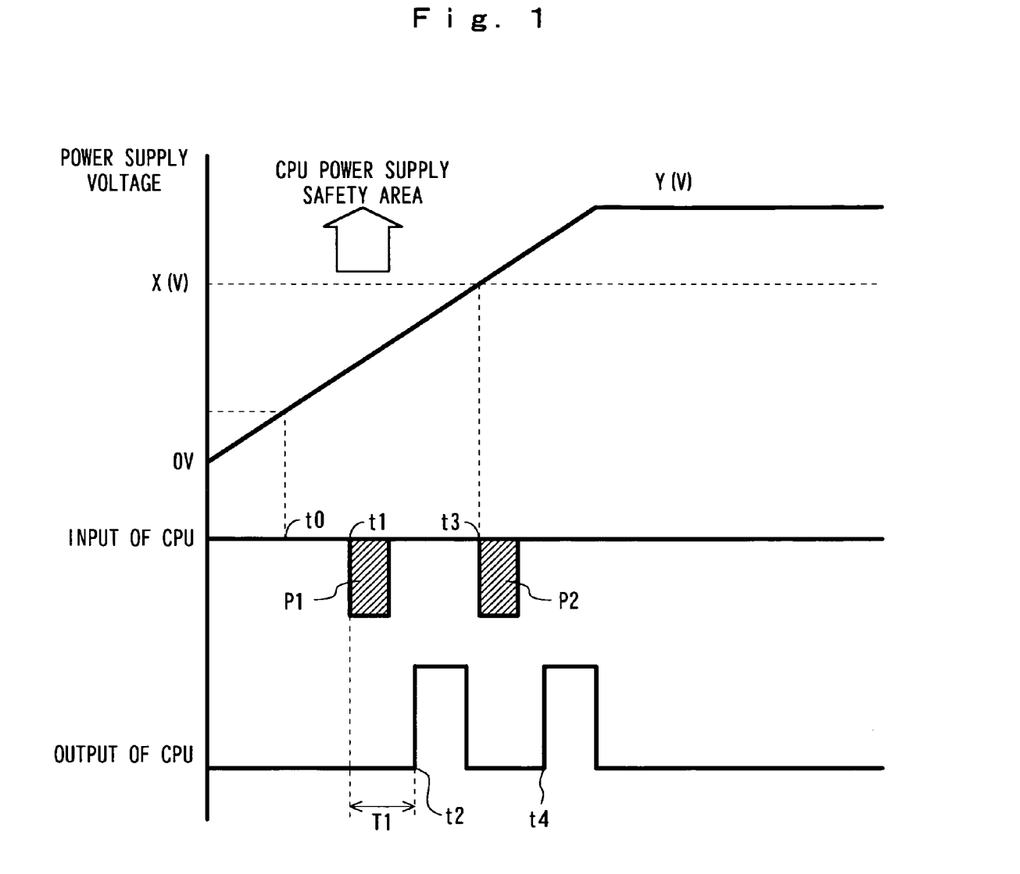
FIG. 1 is a timing chart showing operation of an engine starting apparatus according to an embodiment of the present invention.

FIG. 1 is a timing chart showing output timing of the ignition instructions. In FIGS. 1 and 3 to 5, if the recoil starter 41 is operated to rotate the flywheel 57, output of the power generator which is directly connected to the engine 42 is increased, voltage of the regulator 26 (voltage of power supply) is gradually increased so that the CPU 27 can start up at timing t0, the CPU 27 is reset and the CPU 27 starts up. A pulse P1 is inputted from the revolution number sensor 29 as a first signal with respect to the CPU 27 at timing t1. If the pulse P1 is inputted, the CPU 27 outputs first ignition instructions at timing t2 after preset time T1 is elapsed. Then, a second pulse P2 is input from the revolution number sensor 29 at timing t3. Since the CPU 27 already normally operates at the timing t0, the revolution number of the engine 42 is calculated by the time interval between the pulses p1 and p2.

If the revolution number of the engine 42 is calculated, the ignition timing map 30 is retrieved in accordance with the revolution number, and the ignition timing is obtained. In accordance with the ignition timing, the ignition instructions are output at timing t4. Thereafter, ignition is carried out at the ignition timing determined based on the engine revolution number using the ignition timing map 30 in the same manner, and the engine 42 is normally operated.

Figure 6:
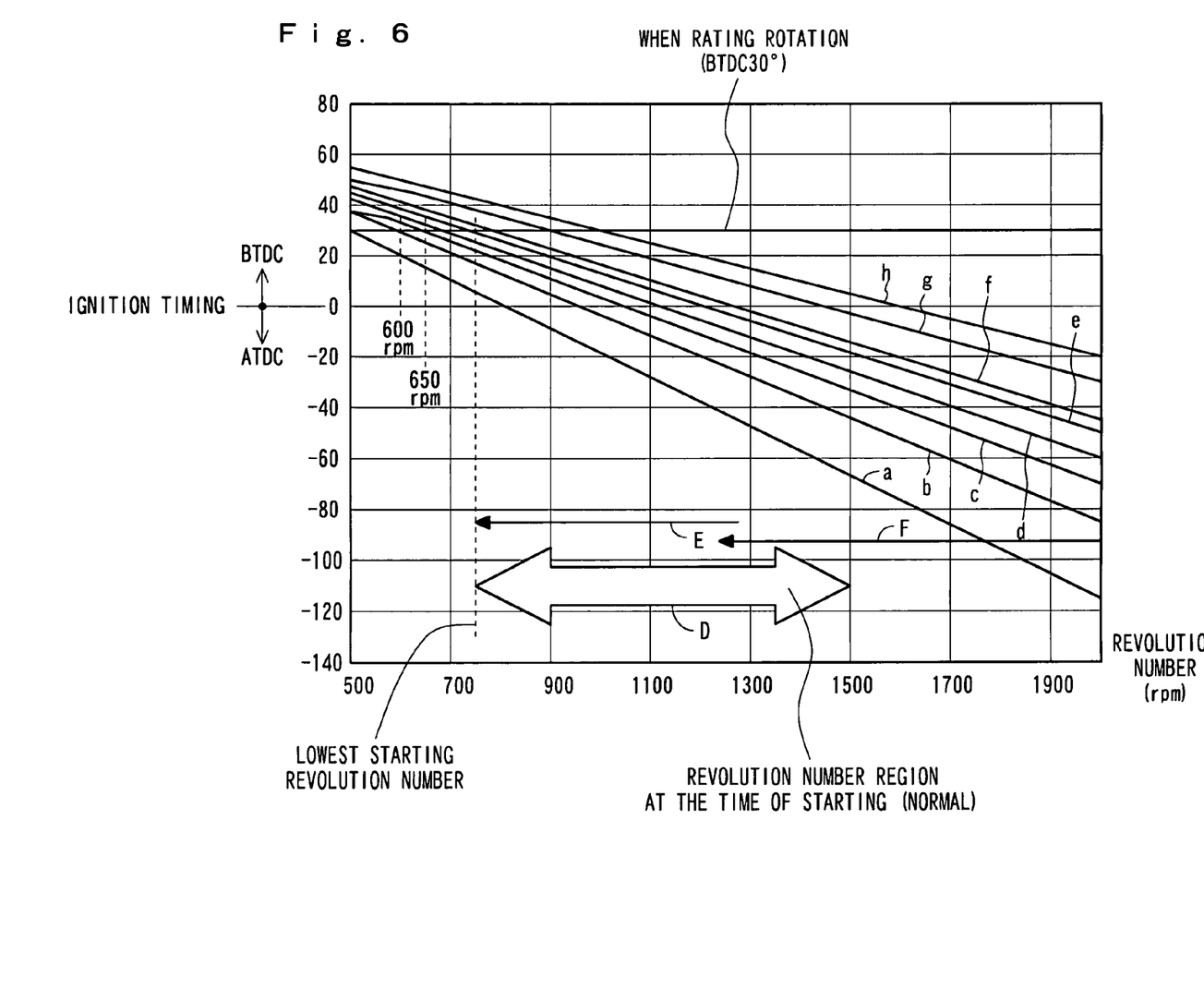
FIG. 6 is a diagram showing characteristics of a relation between the engine revolution number and the ignition timing.

After the CPU 27 is reset, time required for generating the first ignition instructions is determined in the following manner. FIG. 6 shows a relation between the ignition timing and the revolution number of the engine. This example assumes on a case in which appropriate ignition timing in the rating operation is 30° before the top dead center of compression (BTDC). FIG. 6 shows a result of simulation showing the relation between the engine revolution number and the actual ignition timing so that the ignition timing becomes BTDC 30° in each of various cases in which the recoil starter is pulled with various forces, that is to say, in which the engine is started with various revolution number.

In FIG. 6, as shown with a line a, if characteristics are set such that the ignition timing becomes BTDC 30° when the engine revolution number when the recoil starter is operated becomes 500 rpm, the ignition timing corresponding to the revolution number is largely reduced toward the right side. As can be understood from the line a, if the recoil starter is pulled with further strong force, the engine revolution number is increased, and the ignition timing is largely lagged in angle.

As shown with a line h, if characteristics are set such that the ignition timing becomes BTDC 30° when the engine revolution number when the recoil starter is operated becomes 1,000 rpm, the ignition timing corresponding to the revolution number is gently reduced toward the right side. The line h shows that when the recoil starter is pulled with stronger force, a degree of angle of lag is gentle, but when the force for pulling the recoil starter is less than the engine revolution number of 1,000 rpm, the ignition timing leads in angle from the appropriate ignition timing.

As shown with a line e, if characteristics are set such that the ignition timing becomes BTDC 30° when the engine revolution number becomes 750 rpm (lowest starting revolution number) by the operation of the recoil starter, the ignition timing corresponding to the revolution number is reduced relatively gently toward the right side even if the recoil starter is pulled with stronger force, the angle of lead falls within an appropriate range.

Therefore, it is most preferable to set the characteristics (like the line e) such that the ignition timing becomes the ignition timing BTDC 30° of the rating revolution number when the recoil starter is operated such that the lowest starting revolution number is obtained. It is only necessary that the ignition angle be lagged from the ignition angle at the time of rating operation at least when the recoil starter is pulled such that the lowest starting revolution number is obtained. This is because that if the recoil starter is pulled with great force, although the angle of lead of the ignition timing becomes large, since the inertia of the engine is large, climb over torque exceeds climb over torque of the compression top dead center and the piston can climb over the compression top dead center. That is, a recommended range of the first ignition timing is in a range of the lines d and e in FIG. 6.

From the above-described reason, when the engine is used in a revolution range where the inertia of the engine becomes great, that is, when the lowest starting revolution number is set high, it is possible to sufficiently meet the requirement even with the characteristics a, b and c.

When the lowest starting revolution number is set low, it is preferable to secure the BTDC 0° or higher in the lowest starting revolution number.

In FIG. 6, a range shown with an arrow D is one example of a revolution number region when the engine is started. Especially in a range shown with an arrow E, sufficient torque for climbing over the compression top dead center can not be obtained and thus, the angle of lag of the ignition timing is effective. In a range shown with an arrow F, since the inertia of rotation by the recoil starter is great, sufficient torque for climbing over the compression top dead center can be obtained.

Figure 7:
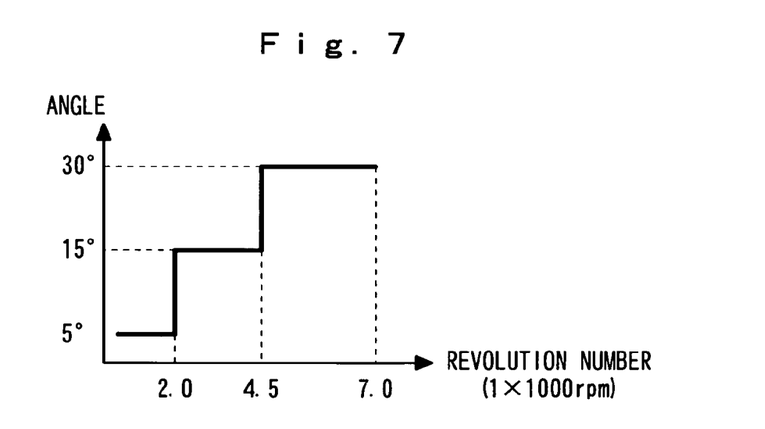
FIG. 7 is a diagram showing characteristics of a relation between the engine revolution number and the ignition timing.

FIG. 7 shows one example of the ignition timing map. After the CPU 27 starts up and the program is set, the ignition timing is determined using this ignition timing map. That is, in the example explained with reference to FIG. 1, the ignition timing map is used when the ignition instructions timing of the second pulse P2 and subsequent pulse is determined. As shown in FIG. 7, the ignition timing is set such that the timing leads in stages with the engine revolution number. The amount of angle of lead is shown with the crank angle on the basis of the top dead center. The amount of angle of lead is set to 5° up to the engine revolution number of 2,000 rpm, and the amount of angle of lead is set to 15° in the rating operation of 2,000 rpm to 4500 rpm. Further the amount of angle of lead is set to 30° in the rating operation of 4,500 rpm or higher.

Although the starting operation device is the manually operated recoil starter in the embodiment, the starting operation device is not limited to the manually operated recoil starter, and recoil starters which are operated by a foot or which are started using a spring as auxiliary power are included. In a word, the starting operation device means a device for starting an engine humanly without using a power supply such as a battery, and the present invention is suitable for an engine which is started by such a device.

The invention claimed is:

1. An engine starting apparatus comprising, an engine, a power generator which is directly connected with the engine, and an ignition device which is controlled by a microcomputer using electricity output from the power generator as a power supply,
   wherein the engine starting apparatus further comprises:
      a sensor for outputting a reference signal of an engine rotation position; and
      a humanly operative starting device which rotates a flywheel connected to the output shaft of the engine,
   the microcomputer comprises:
      a processing function for calculating an engine revolution number based on a period of the reference signal and determining ignition timing based on the engine revolution number thus calculated; and
   an initial igniting function for generating ignition instructions when a preset time has been elapsed after the reference signal of the engine rotation position is first input to the microcomputer after the microcomputer has been started up by the electricity output from the power generator operated by the humanly operative starting device and before a voltage of the power supply reaches a voltage high enough to operate the processing function, and
   the microcomputer generates the ignition instructions according to the ignition timing determined by the processing function instead of the ignition instructions generated by the initial igniting function after the ignition instructions are first given by the initial igniting function.

2. The engine starting apparatus according to claim 1, wherein the preset time is set such that the ignition instructions are generated with ignition angle which is lagged from ignition angle used at the time of rating operation when the engine revolution number by the operation of the humanly operative starting device is predetermined lowest starting revolution number.

3. The engine starting apparatus according to claim 1 or 2, wherein the ignition device is configured to be ignited at an ignition angle corresponding to the engine revolution number.

* * * * *